(12) United States Patent
Kapale et al.

(10) Patent No.: US 11,659,361 B2
(45) Date of Patent: May 23, 2023

(54) METHOD AND APPARATUS FOR HANDLING MISSION CRITICAL SERVICES IN A WIRELESS COMMUNICATION NETWORK

(71) Applicant: Samsung Electronics Co., Ltd., Suwon-si (KR)

(72) Inventors: Kiran Gurudev Kapale, Bangalore (IN); Arunprasath Ramamoorthy, Bangalore (IN); Sapan Pramodkumar Shah, Bangalore (IN); Basavaraj Jayawant Pattan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/444,889

(22) Filed: Aug. 11, 2021

(65) Prior Publication Data

US 2022/0053298 A1 Feb. 17, 2022

(30) Foreign Application Priority Data

Aug. 12, 2020 (IN) .............................. 202041034732
Jun. 11, 2021 (IN) .............................. 202041034732

(51) Int. Cl.
*H04W 4/10* (2009.01)
*H04W 76/45* (2018.01)

(52) U.S. Cl.
CPC ............. *H04W 4/10* (2013.01); *H04W 76/45* (2018.02)

(58) Field of Classification Search
CPC .............................. H04W 4/10; H04W 76/45
See application file for complete search history.

(56) References Cited

U.S. PATENT DOCUMENTS 10,681,505 B2 * 6/2020 Baek .................... H04W 76/18
11,259,150 B2 * 2/2022 Baek .................... H04W 76/14
(Continued)

FOREIGN PATENT DOCUMENTS

| WO | 2016111528 A1 | 7/2016 |
| WO | 2016161599 A1 | 10/2016 |

OTHER PUBLICATIONS

International Search Report and Written Opinion of the International Searching Authority in connection with International Application No. PCT/KR2021/010687 dated Nov. 10, 2021, 9 pages.
(Continued)

*Primary Examiner* — Hai V Nguyen

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure relates to a wireless communication network, and more specifically related to method and apparatus for handling mission critical service (MCS) in the wireless communication network.

20 Claims, 11 Drawing Sheets

(56) References Cited

U.S. PATENT DOCUMENTS

| | | | |
|---|---|---|---|
| 2016/0381528 A1* | 12/2016 | Lee | H04W 4/10 |
| | | | 455/404.1 |
| 2017/0257751 A1 | 9/2017 | Atarius et al. | |
| 2017/0347220 A1* | 11/2017 | Hole | H04W 4/50 |
| 2018/0139762 A1* | 5/2018 | Cho | H04W 4/90 |
| 2018/0242120 A1* | 8/2018 | Baek | H04W 76/14 |
| 2019/0014448 A1* | 1/2019 | Baek | H04L 65/1086 |
| 2019/0037617 A1* | 1/2019 | Kapatralla | H04W 4/90 |
| 2020/0162858 A1* | 5/2020 | Baek | H04W 76/50 |
| 2020/0344578 A1* | 10/2020 | Baek | H04L 12/1822 |
| 2022/0167126 A1* | 5/2022 | Baek | H04W 4/10 |
| 2022/0248186 A1* | 8/2022 | Baek | H04L 65/1086 |

OTHER PUBLICATIONS

3GPP TS 23.379 V17.3.2 (Jul. 2020); Technical Specification; 3rd Generation Partnership Project; Technical Specification Group Services and System Aspects; Functional architecture and information flows to support Mission Critical Push to Talk (MCPTT); Stage 2; (Release 17); 247 pages.

3GPP TS 24.380 V16.5.0 (Jun. 2020) Technical Specification; 3rd Generation Partnership Project; Technical Specification Group Core Network and Terminals Mission Critical Push to Talk (MCPTT) media plane control; Protocol specification (Release 16); 273 pages.

\* cited by examiner

FIG. 8B

User - id = URI

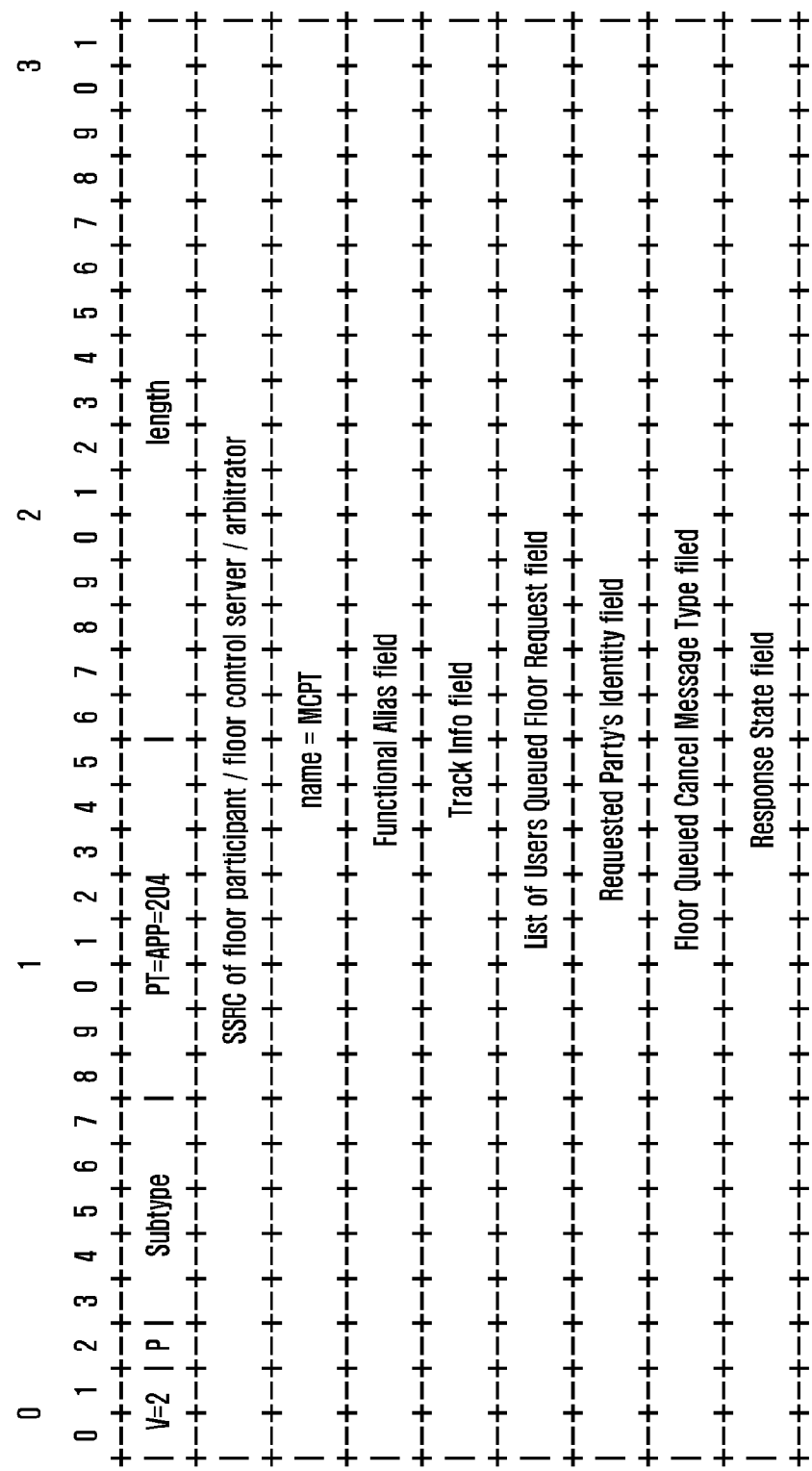

METHOD AND APPARATUS FOR HANDLING MISSION CRITICAL SERVICES IN A WIRELESS COMMUNICATION NETWORK

CROSS-REFERENCE TO RELATED APPLICATIONS

This application is based on and claims priority under 35 U.S.C. § 119 to Indian Provisional Patent Application No. 202041034732, filed on Aug. 12, 2020, and Indian Non-Provisional Patent Application No. 202041034732, filed on Jun. 11, 2021, in the Indian Patent Office, the disclosures of which are incorporated by reference herein in their entirety.

BACKGROUND

1. Field

The present disclosure relates to a wireless communication network, and more specifically related to method and apparatus for handling mission critical service (MCS) in the wireless communication network.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the continuous growth and development in a telecommunication industry, calls with floor handling have become important for first responders. Such calls usually involve a number of participants communicating among themselves where single or multiple users can request for the floor at time and which requires an appropriate treatment.

In an example, the calls are used in case of MCS with highest priority and multiple participants can request for the floor at time and which can get into floor control queue. Sometimes there is a need for an authorized mission critical push to talk (MCPTT) user to request floor request cancellation for one or more floor participants, whose floor request needs to be removed from the floor queue. The MCSs are regarded as critical to an operation, such that any disruption or failure with respect to reception of the data pertaining to such service may be catastrophic and probable to cause fatalities since the MCS is known to be connected with preventing loss of human life and property.

As specified in $3^{rd}$ generation partnership project technical specification (3GPP TS) 23.379, a MCPTT user may be an authorized user who has rights to cancel the floor requests of other MCPTT users, whose floor requests are in a floor control queue and all the users are notified about their queued floor requests are being removed from the queue. Currently, there is no procedure defined to cancel the queued floor request of other MCPTT users in the floor control queue and notify the users of the same.

SUMMARY

Accordingly, embodiments herein disclose a method for handling a MCS in a wireless communication network. The method includes receiving, by a MCPTT server, a floor queued cancel request message, to cancel at least one queued floor request from a first MCPTT client. The at least one queued floor request is associated with at least one second MCPTT client. Further, the method includes determining, by the MCPTT server, whether the at least one queued floor request associated with the at least one second MCPTT client is cancelled based on the received floor queued cancel request message. Further, the method includes performing, by the MCPTT server, at least one of: sending a first notification to the at least one second MCPTT client that the at least one queued floor request is cancelled, and sending the first notification and a second notification to the at least one second MCPTT client that the at least one queued floor request is not cancelled.

In an embodiment, the method further includes sending, by the MCPTT server, a response to the floor queued cancel request message to the first MCPTT client based on at least one of the first notification and the second notification, wherein the response comprises at least one of floor control queue cancel information, an information about the at least one second MCPTT client, or a state of the response.

In an embodiment, the state of the response comprises at least one of a floor taken state, a pending floor revoke state, a not-permitted and floor taken state, a not-permitted and floor idle state, or a permitted state.

In an embodiment, at least one of the first notification and the second notification comprises at least one bit indicator, wherein the at least one bit indicator represents a message type field set value, a source field set value, operation of a timer, an information of the MCPTT client, and a state of the at least one second MCPTT client.

In an embodiment, determining, by the MCPTT server, that the at least one queued floor request associated with the at least one second MCPTT client is cancelled based on the received floor queued cancel request message includes determining that the at least one queued floor request meets a predefined threshold, determining that the first MCPTT client is an authorized client, wherein the authorized client is at least one of a dispatcher, a dispatch supervisor and a mission critical (MC) service administrator, and determining that the at least one queued floor requests associated with the at least one second MCPTT client is cancelled in response to determining that the at least one queued floor request meets the predefined threshold and the first MCPTT client is the authorized client.

In an embodiment, when the first MCPTT client is not an authorized client, the method further includes performing, by the MCPTT server, at least one of: sending a response comprising a response state field and a value indicating that the first MCPTT client is not the authorized client, sending a response comprising a track information field, if the floor queued cancel request message included the track information field, and setting a bit indicator in a response to the at least one floor queued cancel request message, wherein the bit indicator corresponds to an acknowledgment message.

In an embodiment, sending, by the MCPTT server, the response to the floor queued cancel request message to the first MCPTT client includes determining whether an active floor request queue is empty, and performing at least one of: sending the response comprising at least one of a response state field and a value indicating that the active floor request queue is empty in response to determining that the active floor request queue is empty, setting a bit indicator in the response to the at least one floor queued cancel request message in response to determining that the active floor request queue is empty, wherein the bit indicator corresponds to an acknowledgment message, sending the response comprising at least one of a response state field and a value indicating that removal of a queued floor request is success in response to determining that the active floor request queue is not empty, and sending the response comprising a track information field, if the received floor queued cancel request message included the track information field.

In an embodiment, sending, by the MCPTT server, the first notification to the at least one second MCPTT client that the at least one queued floor request is cancelled includes determining that an active floor request queue is not empty, and performing at least one of: removing a queued floor request associated with the at least one second MCPTT client identified in a list of user identification field from the active floor request queue in response to determining that the active floor request queue is not empty, and sending a floor queued cancel notification message to the at least one second MCPTT client, wherein the queued floor request has been removed from the queue, in response to determining that the active floor request queue is not empty.

In an embodiment, sending, by the MCPTT server, the first notification and the second notification to the at least one second MCPTT client that the at least one queued floor request is not cancelled includes determining that an active floor request queue is not empty, and sending the second notification comprising a floor queue position information message to the at least one second MCPTT client in an active floor request queue in response to determining that the active floor request queue is not empty, wherein the floor queue position information message comprises at least one of a queue position, a floor priority in the queue and a track information field.

In an embodiment, the floor queued cancel request message includes at least one of an identity field of the first MCPTT client, a floor queued cancel message type field, and a floor queue cancel response state field in a synchronization source (SSRC) field, where the SSRC field is coded as specified in internet engineering task force request for comments (IETF RFC) 3550.

In an embodiment, the floor queued cancel request message is used in an on-network mode, wherein the floor queued cancel request message is used over a unicast bearer in the on-network mode.

In an embodiment, the track information field is included when a MCPTT event involves a non-controlling MCPTT function.

In an embodiment, an identity field of the first MCPTT client is added when the floor queued cancel request message is originated by the first MCPTT client, wherein the identity field of the first MCPTT client may not be added if the floor queued cancel request message is originated by the MCPTT server.

Accordingly, embodiments herein disclose a method for handling a MCS in a wireless communication network. The method includes sending, by a first MCPTT client, a floor queued cancel request message to cancel at least one queued floor request associated with at least one second MCPTT client to a MCPTT server. Further, the method includes receiving, by the MCPTT client, a response to the floor queued cancel request message from the MCPTT server based on the floor queued cancel request message.

In an embodiment, the response includes at least one bit indicator, where the at least one bit indicator represents a message type field set value, a source field set value, operation of a timer, and a state of the first MCPTT client, where the state of the first MCPTT client comprises at least one of no-permission states.

In an embodiment, receiving, by the MCPTT first client, the response to the floor queued cancel request message from the MCPTT server includes starting, by the first MCPTT client, a timer indicating a period for which the floor queued cancel request message may be cancelled, determining, by the first MCPTT client, that the at least one queued floor requests associated with the second MCPTT client is not cancelled upon expiry of the timer, resending, by the first MCPTT client, a floor queued cancel request message to cancel at least one queued floor request associated with at least one second MCPTT client to the MCPTT server; and receiving, by the first MCPTT client, the response to the floor queued cancel request message from the MCPTT server.

Accordingly, embodiments herein disclose a MCPTT server for handling a MCS in a wireless communication network. The MCPTT server includes a MCS controller coupled with a memory and a processor. The MCS controller is configured to receive a floor queued cancel request message, to cancel at least one queued floor request, from a MCPTT client. The at least one queued floor request is associated with at least one second MCPTT client. Further, the MCS controller is configured to determine whether the at least one queued floor request associated with the at least one second MCPTT client is cancelled based on the received floor queued cancel request message. Further, the MCS controller is configured to send a first notification to the at least one second MCPTT client that the at least one queued floor request is cancelled. Further, the MCS controller is configured to send the first notification and a second notification to the at least one second MCPTT client that the at least one queued floor request is not cancelled.

Accordingly, embodiments herein disclose a first MCPTT client for handling a MCS in a wireless communication network. The MCPTT includes a MCS controller coupled with a memory and a processor. The MCS controller is configured to send a floor queued cancel request message to cancel at least one queued floor request associated with at least one second MCPTT client to a MCPTT server. Further, the MCS controller is configured to receive a response to the floor queued cancel request message from the MCPTT server based on the floor queued cancel request message.

The principal object of the embodiments herein is to disclose method and apparatus for handling a MCS in a wireless communication network.

Another object of the embodiments herein is to receive a floor queued cancel request message to cancel one or more queued floor request associated with one or more second MCPTT client from a first MCPTT client by a MCPTT server.

Another object of the embodiments herein is to determine whether the one or more queued floor request associated with the one or more second MCPTT client is cancelled based on the received floor queued cancel request message by the MCPTT server.

Another object of the embodiments herein is to send a first notification to the one or more second MCPTT client that the one or more queued floor request is cancelled by the MCPTT server.

Another object of the embodiments herein is to send the first notification and a second notification to the one or more second MCPTT client that the one or more queued floor request is not cancelled by the MCPTT server.

Another object of the embodiments herein is to send a response to the floor queued cancel request message to the first MCPTT client based on the first notification and the second notification by the MCPTT server.

Another object of the embodiments herein is to start a timer indicating a period for which the floor queued cancel request message may be cancelled by the first MCPTT client.

Another object of the embodiments herein is to determine that the one or more queued floor request associated with the second MCPTT client is not cancelled upon expiry of the timer by the first MCPTT client.

Another object of the embodiments herein is to resend a floor queued cancel request message to cancel the one or more queued floor request associated with the one or more second MCPTT client to the MCPTT server by the first MCPTT client.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 8B describes an augmented Backus-Naur form (ABNF) syntax of string values of a user ID value, according to embodiments as disclosed herein;

FIG. 10 illustrates a content of a floor queued cancel message, according to embodiments as disclosed herein.

DETAILED DESCRIPTION

Figure 1:
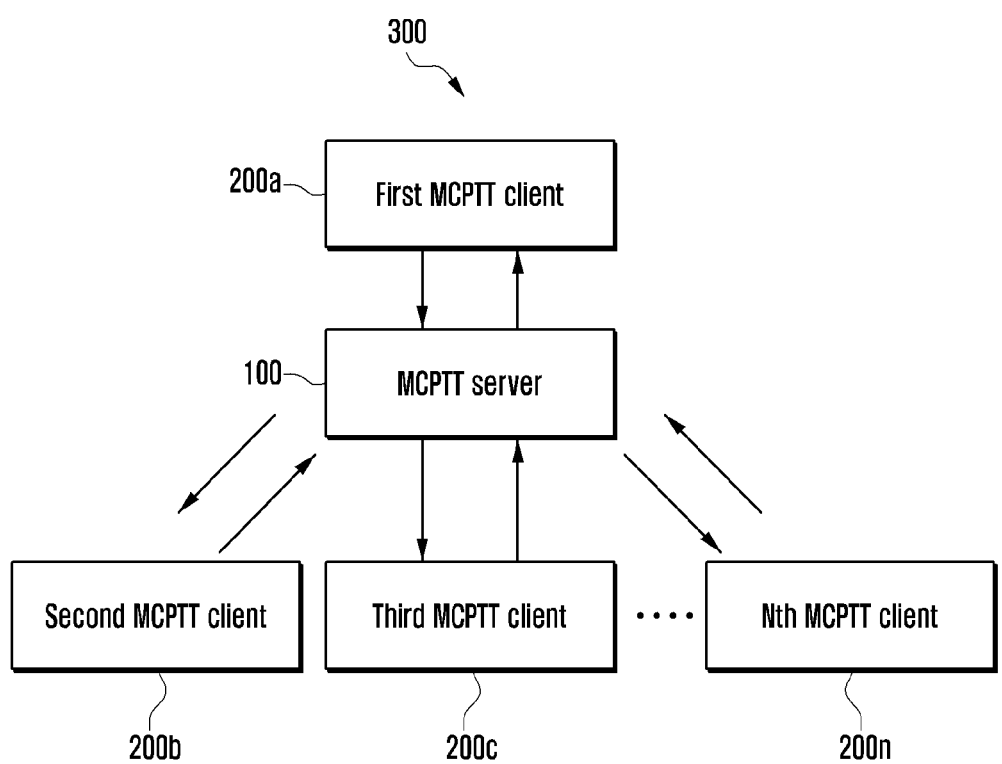
FIG. 1 illustrates a wireless communication network for handling a MCS, according to embodiments as disclosed herein.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The terms "floor queued cancel request message," "floor queued cancel message," "floor request cancel message" and "floor release message" are used interchangeably in the patent disclosure. The terms "floor control server," "floor arbitrator," and "MCPTT server" are used interchangeably in the patent disclosure.

The embodiments herein achieve methods for handling a MCS in a wireless communication network. The method includes receiving, by a MCPTT server, a floor queued cancel request message, to cancel at least one queued floor request, from a first MCPTT client. The at least one queued floor request is associated with at least one second MCPTT client. Further, the method includes determining, by the MCPTT server, whether the at least one queued floor request associated with the at least one second MCPTT client is cancelled based on the received floor queued cancel request message. Further, the method includes performing, by the MCPTT server, at least one of: sending a first notification to the at least one second MCPTT client that the at least one queued floor request is cancelled, or sending the first notification and a second notification to the at least one second MCPTT client that the at least one queued floor request is not cancelled.

The method can be used for canceling the queued floor requests of other MCPTT users from the floor control queue (i.e., floor request queue) and notifying the users of floor request being removed from the queue. The terminology "floor control queue" and "floor request queue" are used interchangeably in the patent disclosure. This allows an authorized user associated with the MCPTT client to intervene and clear the floor requests if the MCPTT server is reaching a threshold limit set by a service provider or a user of the service provider and if the MCPTT server and the authorized user associated with the MCPTT client want to hear from a particular important user who is in the queue and need immediate assistance in the wireless communication network. Hence, the method can be used to improve the user experience.

In an example, based on the provided method, once the call is established in the wireless communication network, multiple users associated with the one or more MCPTT client can request for the floor. If the floor is already granted to one user and at the same time, other users also request for the floor then the floor requests get queued and added to a floor control queue. Once the granted floor of a user request for a floor release or completes the granted time, then the next user's floor request from the queue is granted the permission to send a data (e.g., text, audio, video, media or the like). This continues until the floor queue is completely served. If an authorized user would like to clear the queued request of other users, then the request of the authorized user may be sent to remove all the stored floor requests from the queue of all the other users. The users whose queued request are being removed from the floor control queue may be notified about their removal from the queue.

Various embodiments of the provided method are adopted in the 3GPP TS 24.380.

Referring now to the drawings, and more particularly to FIGS. 1 through 10, where similar reference characters denote corresponding features consistently throughout the figures, there are shown at least one embodiment.

FIG. 1 illustrates a wireless communication network (300) for handling a MCS, according to embodiments as disclosed herein. The wireless communication network (300) can be a MCPTT network. In an embodiment, the wireless communication network (300) includes a MCPTT server (100) and one or more MCPTT client (200a-200n). The one or more MCPTT client (200a-200n) can be, for example, but not limited to a cellular phone, a smart phone, a smart watch, a personal digital assistant (PDA), a tablet computer, a laptop computer, a virtual reality device, an immersive system, an Internet of Things (IoT), a smart sensor, a drone, a vehicle or the like. The one or more MCPTT client (200a-200n) is communicated with the MCPTT server (100) and a network entity (not shown). The network entity may also include or be referred to by those skilled in the art as a base station, a base transceiver station, a radio base station, an access point, a radio transceiver, an eNB, a gNodeB (GNB), a fifth generation (5G) eNB, or the like. The one or more MCPTT client (200a-200n) communicates with the wireless communications network (300) through the network entity. The MCPTT network defines a concept of shareable MCPTT client (200a-200n). In an embodiment, the shareable MCPTT client (200a-200n) can be considered as a pool of MCPTT clients, where each MCPTT client being interchangeable with any other MCPTT responders/users (public safety (PS) agent), and MCPTT users/responders/PS agent randomly choosing one or more MCPTT client from the pool.

In general, once the call is established, multiple users associated with the one or more MCPTT client (200a-200n) can request for the floor. In an example, the MCPTT client (200n) sends a first queued floor request to the MCPTT server (100). A third MCPTT client (200c) sends a second queued floor request to the MCPTT server (100). A second MCPTT client (200n) sends a third queued floor request to the MCPTT server (100). Now, the first queued floor request, the second queued floor request and the third queued floor request are in the floor queue. Based on the present disclosure method, if an authorized user associated MCPTT client (200a) would like to clear the queued request of other users (e.g., MCPTT client (200b-200n)), then the floor queued cancel request message of the authorized user may be sent to the MCPTT server (100) to remove all the stored floor requests from the queue of all the other users. The users whose queued request are being removed from the floor control queue may be notified about their removal from the queue.

In an embodiment, the MCPTT client (200a) starts a timer (as shown in the FIG. 3) indicating a period for which the floor queued cancel request message may be cancelled. The MCPTT client (200a) determines whether the one or more queued floor request associated with the MCPTT client (200b-200n) is cancelled before expiry of the timer. If the one or more queued floor request associated with the MCPTT client (200b-200n) is not cancelled before expiry of the timer then, the MCPTT client (200a) resends the floor queued cancel request message to cancel the one or more queued floor request associated with the one or more MCPTT client (200b-200n) to the MCPTT server (100).

If the one or more queued floor request associated with the MCPTT client (200b-200n) is cancelled before expiry of the timer then, the MCPTT server (100) sends the response to the floor queued cancel request message to the MCPTT client (200a).

In an embodiment, the MCPTT server (100) sends a first notification indicated that the at least one queued floor request is cancelled to the MCPTT client (200b-200n). In another embodiment, the MCPTT server (100) sends the first notification and the second notification indicated that the at least one queued floor request is not cancelled to the MCPTT client (200b-200n).

In an embodiment, the authorized user associated with the MCPTT client (200a) instructs a floor requesting user (i.e., target user) to initiate a floor request cancel message or a floor release message. The authorized user instruction to the floor requesting user could be in-band new media burst release message (MBCP) message that is unicast relayed by the MPCTT server (100) (i.e., floor control server) to the target user or out-of-band message (e.g., via session initiation protocol (SIP) message outside of MBCP session). Further, the target user initiates the floor request cancel message or the floor release message in order to get removed from the floor request queue.

Following depicts the behavior and captures a flow of the floor queued cancel request message for better understanding in the wireless communication network (300).

According to the 3GPP TS 24.380, a list of floor control messages is listed in the table 1. In the table 1, the subclauses as referred to herein can be from existing specification (TS 3GPP 24.380 specification) or from the current document (wherever applicable).

In the table 1, for some messages, the first bit (marked as x in the subtype) can be used to indicate if a sender (e.g., MCPTT client (200a-200n)) wants to have an acknowledgment. The x is coded as follows: "0"—acknowledgment is not required, "1"—acknowledgment is required.

Whether the message needs to be acknowledged or not is described herein. If an acknowledgment is required, a floor acknowledgement message can be used to acknowledge the message.

TABLE 1

| Message name | Subtype | Reference | Direction |
| --- | --- | --- | --- |
| Floor Request | 00000 | Subclause 8.2.4 | Client → server |
| Floor Granted | x0001 | Subclause 8.2.5 | Server → client |
| Floor Deny | x0011 | Subclause 8.2.6 | Server → client |
| Floor Release | x0100 | Subclause 8.2.7 | Client → server |
| Floor Idle | x0101 | Subclause 8.2.8 | Server → client |
| Floor Taken | x0010 | Subclause 8.2.9 | Server → client |
| Floor Revoke | 00110 | Subclause 8.2.10 | Server → client |
| Floor Queue Position Request | 01000 | Subclause 8.2.11 | Client → server |
| Floor Queue Position Info | x1001 | Subclause 8.2.12 | Server → client |
| Floor acknowledgement (Ack) | 01010 | Subclause 8.2.13 | Server → client Client → server |
| Floor Release Multi Talker | 01111 | Subclause 8.2.14 | Server → client |
| Floor Queued Cancel | x1110 | Subclause 8.2.15 | Server → client Client → server |

The floor control server is the MCPTT server, and the floor participant is the MCPTT client.

According to the 3GPP TS 24.380, the subclause describes the floor control specific data fields. The terminology "floor queued cancel," "floor request queue cancel," "floor queued request cancel," "floor queued request," "queued floor request" cancel and any other similar terminology are used interchangeably in the patent disclosure without departing the scope of the present disclosure. The floor control messages can include floor control specific data fields contained in the application-dependent data of the floor control message. The floor control specific data fields follow the syntax specified in Table 2 lists the available floor control specific data fields including the assigned field ID.

TABLE 2

| | Field ID | | |
| --- | --- | --- | --- |
| Field name | Decimal | Binary | Reference |
| Floor Priority | 000 | 00000000 | Subclause 8.2.3.2 |
| Duration | 001 | 00000001 | Subclause 8.2.3.3 |
| Reject Cause | 002 | 00000010 | Subclause 8.2.3.4 |
| Queue Info | 003 | 00000011 | Subclause 8.2.3.5 |
| Granted Party's Identity | 004 | 00000100 | Subclause 8.2.3.6 |
| Permission to Request the Floor | 005 | 00000101 | Subclause 8.2.3.7 |
| User ID | 006 | 00000110 | Subclause 8.2.3.8 |
| Queue Size | 007 | 00000111 | Subclause 8.2.3.9 |
| Message Sequence-Number | 008 | 00001000 | Subclause 8.2.3.10 |
| Queued User ID | 009 | 00001001 | Subclause 8.2.3.11 |
| Source | 010 | 00001010 | Subclause 8.2.3.12 |
| Track Info | 011 | 00001011 | Subclause 8.2.3.13 |

TABLE 2-continued

| Field name | Field ID | | |
|---|---|---|---|
| | Decimal | Binary | Reference |
| Message Type | 012 | 00001100 | Subclause 8.2.3.14 |
| Floor Indicator | 013 | 00001101 | Subclause 8.2.3.15 |
| SSRC | 014 | 00001110 | Subclause 8.2.3.16 |
| List of Granted Users | 015 | 00001111 | Subclause 8.2.3.17 |
| List of SSRCs | 016 | 00010000 | Subclause 8.2.3.18 |
| Functional Alias | 017 | 00010001 | Subclause 8.2.3.19 |
| List of Functional Aliases | 018 | 00010010 | Subclause 8.2.3.20 |
| Location | 019 | 00010011 | Subclause 8.2.3.21 |
| List of Locations | 020 | 00010100 | Subclause 8.2.3.22 |
| Floor Queued Cancel Message Type | 021 | 00010101 | Subclause 8.2.3.23 |
| List of Users | 022 | 00010110 | Subclause 8.2.3.24 |
| Response State | 023 | 00010111 | Subclause 8.2.3.25 |

In the table 2, alternatively, "list of users" field can be renamed to "list of users queued floor request" which can be further used in the floor queue cancel message. The terminology "list of users," "list of queued users," "cancel queued request list of users," "list of users queued floor request," and any other similar terminology are used interchangeably in the patent disclosure without departing the scope of the present disclosure.

The terminology "response state," "replay state," "notification state," "result," and any other similar terminology are used interchangeably in the patent disclosure without departing the scope of the present disclosure.

Figure 7:
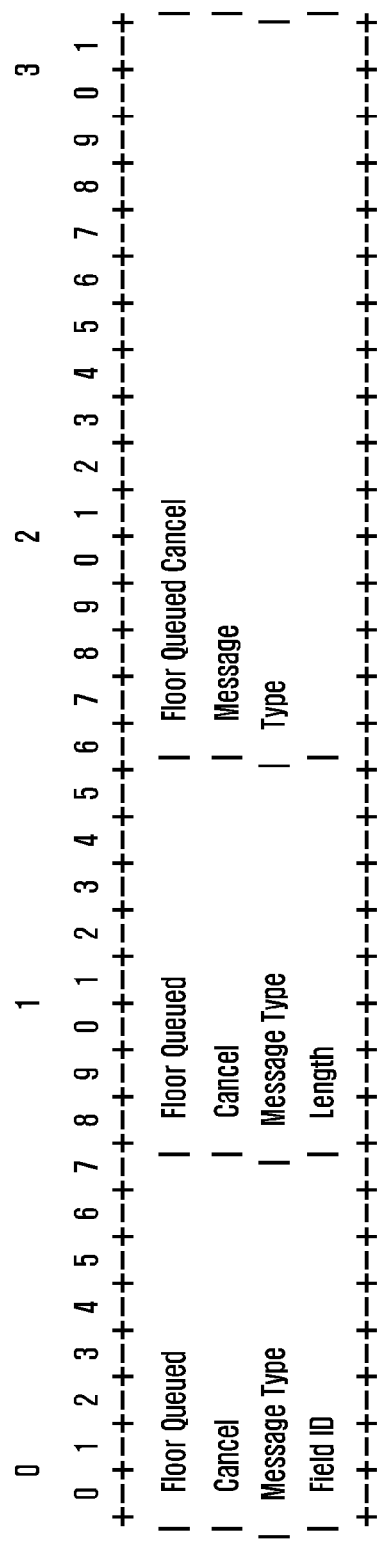
FIG. 7 illustrates a format of a floor queued cancel message type field, according to embodiments as disclosed herein.

Floor queued cancel message type field: according to the 3GPP TS 24.380, the floor queued cancel message type field contains the type of the message requested i.e., request to cancel, cancel notification and response of request to cancel. FIG. 7 illustrates the format of the floor queued cancel message type field. The <floor queued cancel message type field ID> value is a binary value and is set (as depicted in table 2). The <floor queued cancel message type length> value is a binary value and has the value "2" indicating the total length in octets of the <floor queued cancel message type> value item. The <floor queued cancel message type> value is a 16-bit binary value with the following values:
 1. "1"—cancel request,
 2. "2"—response of cancel request,
 3. "3"—cancel notification, and
 4. All other values are reserved for future use.

Figure 8A:
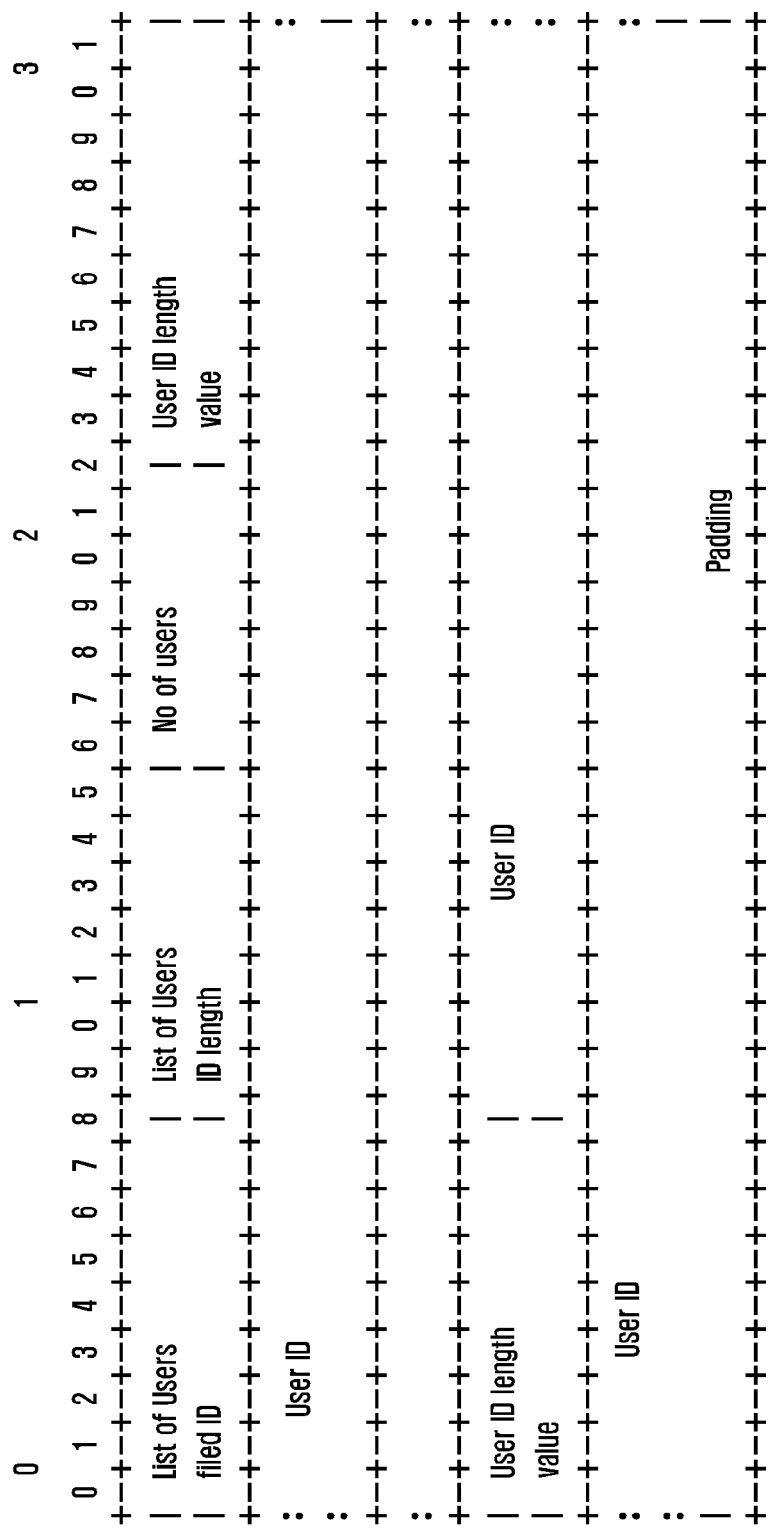
FIG. 8A illustrates a format of a list of user identifiers (IDs) field, according to embodiments as disclosed herein.
Figure 8B:
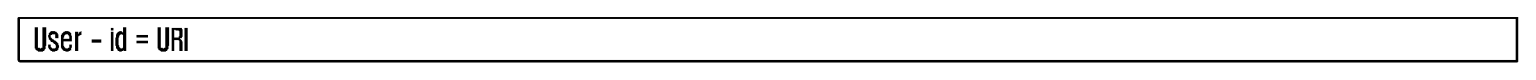

List of users field: according to the 3GPP TS 24.380, the list of users field contains a list of MCPTT IDs of MCPTT users. FIG. 8*a* describes the format of the list of user IDs field. The <list of users field ID> value is a binary value and is set (according to the table 2). The <list of user ID length> value is a binary value and includes the value indicating the length in octets of the <list of user ids>. The <number of users> value is a binary value and includes the number of user ID entries in the list. The <user ID length> value is a binary value and includes the value indicating the length in octets of the <user ID> value item except padding. The <user ID> value is coded (as described in FIG. 8B, which describes the ABNF syntax of string values of the <User ID> value). If the length of the sum of all <user ID length> values and all <user ID> values is not (1+multiple of 4) bytes, then the sum may be padded to (1+multiple of 4) bytes. The value of the padding bytes is set to zero. The padding bytes are ignored by the MCPTT client (200*a*-200*n*).

Figure 9:
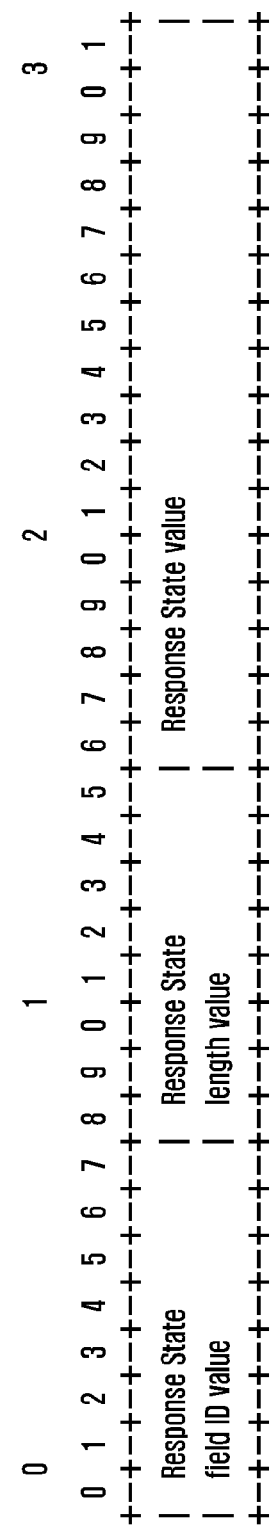
FIG. 9 illustrates a format of a response state field, according to embodiments as disclosed herein.

The response state field indicates cancelation of floor requests of other MCPTT users, whose floor requests are in the floor control queue. FIG. 9 describes the format of the response state field. The <response state field ID> value is a binary value and may be set (according to table. 2). The <response state length> value is a binary value and may have the value "2" indicating the total length in octets of the <response state> value item. The <response state> value is a 16-bit binary value with the following values:
 1. "0"—success,
 2. "1"—fail—not authorized,
 3. "2"—fail—queue is empty,
 4. "3"—fail—floor request does not exist for the specified user,
 5. "4"—fail—unknown reason, and
 6. All other values are reserved for future use.

The floor queued cancel message is a request from a floor participant as the authorized user (If the participant type is a dispatcher, dispatch supervisor and a MC service administrator or based on configuration) to cancel the queued request of other MCPTT users. Similarly, the floor queued cancel request message is used to notify other MCPTT users of the queued request is being cancelled and to the MCPTT client (200*a*) (i.e., originator) of the request to indicate the status of cancelation of queued request.

The floor queued cancel message is used in an on-network mode. In the on-network mode, the floor queued cancel message is only used over a unicast bearer. FIG. 10 depicts a content of the floor queued cancel message.

With the exception of the three first 32-bit words the order of the fields is irrelevant. Subtype: the subtype is coded according to the table 1. Length: the length is coded as specified in the 3GPP TS 24.380.

Synchronization source (SSRC): A SSRC field carries the SSRC of the floor participant/floor control server/floor arbitrator. If the message is for cancelling of the queued floor request then, the SSRC may be of floor participant who is requesting for cancellation. If the message is for notifying the cancelling of queued floor request to the other floor participants or response to the message for cancelling of the queued floor request originated by a floor participant then the SSRC may be of the floor control server/floor arbitrator. The SSRC field is coded as specified in IETF RFC 3550.

Functional alias: The field may be included if the message is for cancelling of the queued floor request from the floor participant or response to the message for cancelling of the queued floor request originated by floor participant. The functional alias field is coded as described in the 3GPP TS 24.380.

Track information (info): the track Info field is included when the MCPTT call involves a non-controlling MCPTT function. The coding of a track Info field is described in the 3GPP TS 24.380

List of users queued floor request: the list of user s field is used only in sending message for cancelling of queued floor request of other MCPTT user's scenario. The list of user's field is coded as specified in the list of user's field and indicates the list of users whose request for permission to send media is queued.

Requested party's identity field: the requested party's identity field may be added only when the floor queue cancel request is originated by the floor participant user. This field may not be added if the floor queue cancel request message is originated by the floor control server (due to local policies). The field is also included in the messages for response to the message for cancelling of the queued floor request originated by floor participant. The requested party's identity field is coded as specified in the 3GPP TS 24.380.

Floor queued cancel message type field: The floor queued cancel message type field is coded as specified in the 3GPP TS 24.380.

Response state field: the response state field is included only when sending response to the message for cancelling of the queued floor request originated by floor participant. The response state field is coded as specified in the 3GPP TS 24.380.

As an alternative embodiment, a new floor queue cancel response message can be defined to send a response state and other related information back to the requester.

Send floor queued cancel request message (S: send floor queued cancel request): Upon receipt of an indication from the MCPTT client (200a) to cancel the floor requests of other MCPTT users, whose floor requests are in the floor control queue, the floor participant (i.e., first MCPTT client (200a)):
1. May send the floor queued cancel request message;
2. May start timer T134 (floor queued cancel request); and
3. Remain in the "U: has no permission" state.

It is an implementation option to handle the receipt of the floor acknowledge message and what action to take if the floor acknowledge message is not received.

Timer T134 (floor queued cancel request) expired:
On expiry of timer T134, the floor participant (i.e., first MCPTT client (200a)):
1. May provide a floor queued cancel request timeout to the first MCPTT client (i.e., 200a);
2. May remain in the "U: has no permission" state.

It is an implementation option to handle the receipt of the timer expiry event and what action to take.

Receive response to floor queued cancel request message (R: response to floor queued cancel request).

Upon receiving a response to the floor queued cancel request message, the floor participant:
1. If the first bit in the subtype of the response to the floor queued cancel request message is set to "1" (Acknowledgment is required) as described in the 3GPP standard specification, may send the floor acknowledge message. The floor acknowledge message:
   a. May include the message type field set to "14" (floor queued cancel request); and
   b. May include the source field set to "0" (the floor participant is the source);
2. May provide the result of request message to the MCPTT user;
3. May stop the timer T134 (Floor queued cancel request), if running; and
4. May remain in the "U: has no permission" state.

Send floor queued cancel request message (S: send floor queued cancel request).

Upon receipt of an indication from the MCPTT client (200a) to cancel the floor requests of other MCPTT users, whose floor requests are in floor control queue, the floor participant (i.e., MCPTT client (200a)):
1. May send the floor queued cancel request message;
2. May start timer T134 (floor queued cancel request); and
3. Remain in the "U: has permission" state.

It is an implementation option to handle the receipt of the floor acknowledge message and what action to take if the floor acknowledge message is not received.

Timer T134 (floor queued cancel request) expired:
On expiry of timer T134 (floor queued cancel request), the floor participant:
1. May provide a floor queued cancel request timeout to the MCPTT client; and
2. May remain in the "U: has permission" state.

It is an implementation option to handle the receipt of the timer expiry event and what action to take.

Receive response to floor queued cancel request message (R: response to floor queued cancel request).

Upon receiving a response to floor queued cancel request message, the floor participant:
1. If the first bit in the subtype of the response to the floor queued cancel request message is set to "1" (acknowledgment is required), may send the floor acknowledgment message. The floor acknowledgment message:
   a. May include the message type field set to "14" (floor queued cancel request); and
   b. May include the source field set to "0" (the floor participant is the source);
2. May provide the result of request message to the MCPTT user;
3. May stop the timer T134 (floor queued cancel request), if running; and
4. May remain in the "U: has permission" state.

Send floor queued cancel request message (S: send floor queued cancel request).

Upon receipt of the indication from the MCPTT client (200a) to cancel the floor requests of other MCPTT users, whose floor requests are in floor control queue, the floor participant:
1. May send the floor queued cancel request message;
2. May start timer T134 (floor queued cancel request); and
3. Remain in the "U: queued" state.

It is an implementation option to handle the receipt of the floor acknowledgment message and what action to take if the floor acknowledgment message is not received.

Timer T134 (floor queued cancel request) expired:
On expiry of timer T134, the floor participant:
1. May provide a floor queued cancel request timeout to the MCPTT client (200a); and
2. May remain in the 'U: queued' state.

It is an implementation option to handle the receipt of the timer expiry event and what action to take.

Receive response to floor queued cancel request message (R: response to floor queued cancel request).

Upon receiving the response to the floor queued cancel request message, the floor participant:
1. If the first bit in the subtype of the response to the floor queued cancel request message is set to "1" (acknowledgment is required), may send the floor acknowledgment message. The floor acknowledgment message:
   a. May include the message type field set to "14" (floor queued cancel request); and
   b. May include the source field set to "0" (the floor participant is the source);
2. May provide the result of request message to the MCPTT user;
3. May stop the timer T134 (floor queued cancel request), if running; and
4. May remain in the "U: queued" state.

Receive floor queued cancel notification message (R: floor queued cancel notification):

Upon receiving the floor queued cancel notification message, the floor participant:
1. If the first bit in the subtype of the floor queued cancel notification message is set to "1" (acknowledgment is required), may send the floor acknowledgment message. The floor acknowledgment message:
  a. May include the message type field set to "14" (floor queued cancel request); and
  b. May include the source field set to "0" (the floor participant is the source);
2. May provide floor queued cancel notification to the MCPTT user based on the response state field;
3. May display the user who has cancelled the floor queued request to the user using information in the requested party's identity field;
4. May stop timer T104 (floor queue position request), if running; and
5. May enter the "U: has no permission" state.

Receive floor queued cancel request message (R: floor queued cancel Request).

Upon receiving the floor queued cancel request message from the associated floor participant, the floor control arbitration procedure in the floor control server (100):
  1. If the active floor request queue is empty:
    a. May send the response to floor queued cancel request message to the associated floor participant. The response to the floor queued cancel request:
      i. May include in the response state field and value as "2" (fail—queue is empty);
      ii. If the floor request included a track info field, may include the received track info field;
    b. May set the first bit in the subtype of the response to the floor queued cancel request message to "1" (Acknowledgment is required) (it is an implementation option to handle the receipt of the floor acknowledgment message and what action to take if the floor acknowledgment message is not received); and.
    c. May remain in the "G: floor taken" state.
  2. If the active floor request queue is not empty the floor control server (100):
    a. May remove the queued floor request of the users identified in the list of user IDs field from the active floor request queue;
    b. May send the floor queued cancel notification message to the associated floor participants whose floor request has been removed from the queue and message is generated.
    c. May send a response to floor queued cancel request message to the associated floor participant. The response to floor queued cancel request:
      i. May include in the response state field and value as "0" (Success);
      ii. If the floor request included a track info field, may include the received track info field;
    d. May send a floor queue position information message to the remaining users in the active floor request queue if any, if negotiated support of queueing of floor requests. The floor queue position info message:
      i. May include the queue position and floor priority in the queue info field; and
      ii. If the floor request message included a track info field, may include the received track info field; and
    e. May remain in the "G: floor taken" state.

Receive floor queued cancel request message (R: floor queued cancel request).

Upon receiving the floor queued cancel request message from the associated floor participant, the floor control arbitration procedure in the floor control server (100):
  1. If the active floor request queue is empty:
    a. May send the response to floor queued cancel request message to the associated floor participant. The response to floor queued cancel request:
      i. May include in the response state field and value as "2" (fail—queue is empty);
      ii. If the floor request included a track info field, may include the received track Info field;
    b. May set the first bit in the subtype of the response to the floor queued cancel request message to "1" (acknowledgment is required); and.
    It is an implementation option to handle the receipt of the floor acknowledgment message and what action to take if the floor acknowledgment message is not received.
    c. May remain in the "G: pending floor revoke" state.
  2. If the active floor request queue is not empty the floor control server (100):
    a. May remove the queued floor request of the users identified in the list of user IDs field from the active floor request queue;
    b. May send the floor queued cancel notification message to the associated floor participants whose floor request has been removed from the queue and message is generated.
    c. May send a response to floor queued cancel request message to the associated floor participant. The response to floor queued cancel request:
      i. May include in the response state field and value as "0" (success);
      ii. If the floor request included a track info field, may include the received track info field;
    d. May send the floor queue position info message to the remaining users in the active floor request queue if any, if negotiated support of queueing of floor requests. The floor queue position info message:
      i. May include the queue position and floor priority in the queue info field; and
      ii. If the floor request message included a Track Info field, may include the received track info field; and
    e. May remain in the "G: pending floor revoke" state.

Receive floor queued cancel request message (R: floor queued cancel request).

Upon receiving the floor queued cancel request message from the associated floor participant:
  1. If the MCPTT ID of the associated floor participant is authorized user (If participant type is dispatcher, dispatch supervisor and MC service administrator) to cancel the floor request of other MCPTT users, whose floor requests are in floor control queue, the floor control interface towards the MCPTT client in the floor control server (100):
    a. May forward the floor queued cancel request message to the floor control server arbitration procedure; and
    b. May remain in the "U: not permitted and floor taken" state.
  2. If the MCPTT ID of the associated floor participant is not authorized user (If participant type is not dispatcher, dispatch supervisor and MC service administrator) to cancel the floor request of other MCPTT users, whose floor requests are in floor control queue, the floor control interface towards the MCPTT client in the floor control server (100):
- a. May send a response to floor queued cancel request message to the associated floor participant. The response to floor queued cancel request:
  - i. May include in the response state field and value as "1" (fail—Not authorized);
  - ii. If the floor request included a track info field, may include the received track info field;
- b. may set the first bit in the subtype of the response to floor queued cancel request message to "1" (acknowledgment is required); and.
  It is an implementation option to handle the receipt of the Floor acknowledgment message and what action to take if the Floor acknowledgment message is not received.
- c. may remain in the "U: not permitted and floor taken" state.

Send response to floor queued cancel request message (S: response to floor queued cancel request).

When receiving the response to floor queued cancel request message from the floor control server arbitration procedure in the MCPTT server (100), the floor control interface towards the MCPTT client in the floor control server (100):
1. May forward the response to floor queued cancel request message to the floor participant; and
2. May remain in the "U: not permitted and floor taken" state.

Send floor queued cancel notification message (S: floor queued cancel notification).

When the floor queued cancel notification message is received from the floor control arbitration procedure in the MCPTT server (100), the floor control interface towards the MCPTT client in the MCPTT server (100):
1. May forward the floor queued cancel notification messages to the associated floor participant;
2. May set the first bit in the subtype of the floor queued cancel notification message to "1" (acknowledgment is required); and It is an implementation option to handle the receipt of the Floor acknowledgment message and what action to take if the Floor acknowledgment message is not received.
3. May remain in the "U: not permitted and floor idle" state.

Receive floor queued cancel request message (R: floor queued cancel request).

Upon receiving a floor queued cancel request message from the associated floor participant:
1. If the MCPTT ID of the associated floor participant is authorized user (If participant type is dispatcher, dispatch supervisor and MC service administrator) to cancel the floor request of other MCPTT users, whose floor requests are in floor queue, the floor control interface towards the MCPTT client in the floor control server (100):
   - a. May forward the floor queued cancel request message to the floor control server arbitration procedure; and
   - b. May remain in the "U: permitted" state.
2. If the MCPTT ID of the associated floor participant is not authorized (If participant type is not dispatcher, dispatch supervisor and MC service administrator) to cancel the floor request of other MCPTT users, whose floor requests are in floor control queue, the floor control interface towards the MCPTT client in the floor control server (100):
   - a. May send a response to floor queued cancel request message to the associated floor participant. The response to floor queued cancel request:
     - i. May include in the response state field and value as "1" (fail—not authorized);
     - ii. If the floor request included a track info field, may include the received track info field;
   - b. May set the first bit in the subtype of the response to floor queued cancel request message to "1" (acknowledgment is required); and.

It is an implementation option to handle the receipt of the floor acknowledgment message and what action to take if the floor acknowledgment message is not received.
   - c. May remain in the "U: permitted" state.

Send response to floor queued cancel request message (S: response to floor queued cancel request).

When receiving the response to floor queued cancel request message from the floor control server arbitration procedure in the MCPTT server (100), the floor control interface towards the MCPTT client in the floor control server (100):
1. May forward the response to floor queued cancel request message to the floor participant; and
2. May remain in the "U: permitted" state.

Send floor queued cancel notification message (S: floor queued cancel notification):

When the floor queued cancel notification message is received from the floor control arbitration procedure in the MCPTT server (100), the floor control interface towards the MCPTT client in the MCPTT server (100):
1. May forward the floor queued cancel notification messages to the associated floor participant;
2. May set the first bit in the subtype of the floor queued cancel notification message to "1" (acknowledgment is required); and It is an implementation option to handle the receipt of the Floor acknowledgment message and what action to take if the floor acknowledgment message is not received.
3. May remain in the "U: permitted" state.

Timers in the on-network floor participant are as following table 3.

TABLE 3

| Timer | Timer value | Cause of start | Normal stop | On expiry |
|---|---|---|---|---|
| T100 (Floor Release) | Configurable as specified in 3GPP TS 24.483. (NOTE 1) | When the floor participant sends a Floor Release message. | Reception of a Floor Idle message or when the floor participant detects the receipt of RTP media. | If the counter is less than the upper limit of C100, a new Floor Release message is sent and counter is incremented by 1. When the limit in C100 is reached, the floor participant stops sending the Floor Release message. |

TABLE 3-continued

| Timer | Timer value | Cause of start | Normal stop | On expiry |
| --- | --- | --- | --- | --- |
| T101 (Floor Request) | Configurable as specified in 3GPP TS 24.483. (NOTE 2) | When the floor participant sends a Floor Request message. T101 is also started when the application layer and signaling plane initiates a session as an implicit floor request using the "mc_implicit_request" as specified in clause 14. | Reception of a Floor Granted message, a Floor Taken message, a Floor Deny message, a Floor Queue Position Info message or when the floor participant receives RTP media from another floor participant. | When T101 expires, a new Floor Request message is sent. |
| T103 (end of RTP media) | Should be equal to T1. Configurable as specified in 3GPP TS 24.483. | Reception of a Floor Taken message or an RTP media packet. T103 is reset and started again every time an RTP media packet is received. | The reception of a Floor Idle message. | When T103 expires the floor control client concludes that the RTP media, which it was started for, has completed. |
| T104 (Floor Queue Position Request) | Configurable as specified in 3GPP TS 24.483. T104 shall only permit a certain number of retransmissions of the Floor Queue Position Request message. | When the floor participant sends a Floor Queue Position Request message. | Reception of a Floor Queue Position Info message. Leaving the 'U: queued' state. | If the counter is less than the upper limit of C104, a new Floor Queue Position Request message is sent and counter is incremented by 1. When the limit in C104 is reached, the floor participant stops sending the Floor Queue Position Request message. |
| T132 (Queued granted user action) | Default value: 2 seconds. Configurable as specified in 3GPP TS 24.483. | When the floor participant receives a Floor Granted message for a queued request. | When a floor participant in 'U: queued' state pushes PTT button. | The floor participant sends a Floor Release message and may indicate to the user that the floor is no more available |
| T134 (Floor Queued Cancel Request) | Default value: 2 seconds. Shall be implementation specific and based on local policies | When the floor participant sends the Floor Queued Cancel Request message. | On receiving the response to the Floor Queued Cancel Request message. | Shall indicate to the user and action can be implementation specific. |

Figure 2:
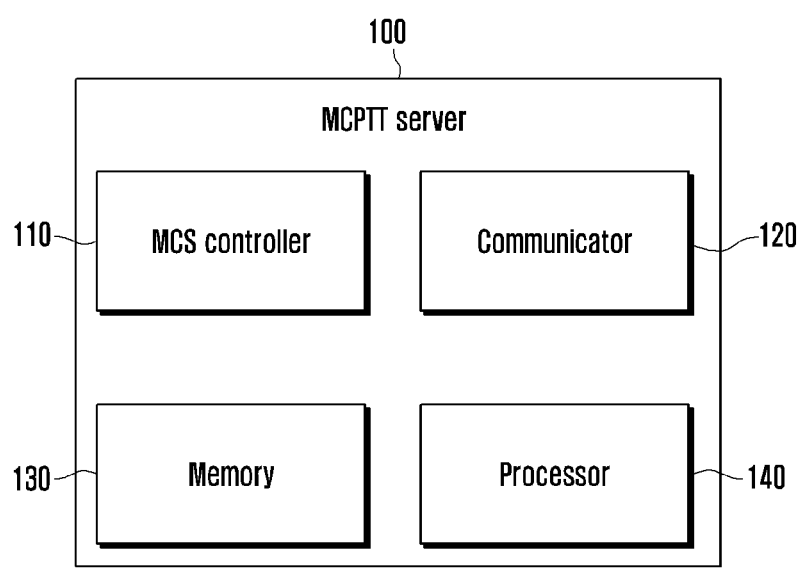
FIG. 2 illustrates various hardware components of a MCPPT server, according to embodiments as disclosed herein.

NOTE 1:
The total time during which the floor participant retransmits the Floor Release messages shall be less than 6 seconds.
NOTE 2:
The total time during which the floor participant retransmits Floor Request messages should be less than 6 seconds FIG. 2 shows various hardware components of the MCPPT server (100), according to embodiments as disclosed herein. In an embodiment, the MCPTT server (100) includes a MCS controller (110), a communicator (120), a memory (130), and a processor (140). The processor (140) is operated with the MCS controller (110), the communicator (120), and the memory (130). The MCS controller (110) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

The MCS controller (110) is configured to receive the floor queued cancel request message, to cancel the one or more queued floor request from the MCPTT client (200a). The at least one queued floor request is associated with at least one second MCPTT client (200b-200n). Based on the received floor queued cancel request message, the MCS controller (110) is configured to determine whether the one or more queued floor request associated with the one or more second MCPTT client (200b-200n) is cancelled. Based on the determination, the MCS controller (110) is configured to send the first notification to the one or more MCPTT client (200b-200n) that the one or more queued floor request is cancelled and send the first notification and the second notification to the one or more MCPTT client (200b-200n) that the one or more queued floor request is not cancelled.

In an embodiment, based on the first notification and the second notification, the MCS controller (110) is configured to send the response to the floor queued cancel request message to the MCPTT client (200a).

Further, the processor (140) is configured to execute instructions stored in the memory (130) and to perform various processes. The communicator (120) is configured for communicating internally between internal hardware components and with external devices via one or more networks. The memory (130) also stores instructions to be executed by the processor (140). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the plurality of modules/controllers may be implemented through an Artificial intelligence (AI) model. A function associated with AI may be performed through the non-volatile memory, the volatile memory, and the processor (140). The processor (140) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 2 shows various hardware components of the MCPPT server (100) but it is to be understood that other embodiments are not limited thereon. In other embodiments, the MCPPT server (100) may include less or a greater number of components. Further, the labels or names of the components are used only for illustrative purpose and does not limit the scope of the present disclosure. One or more components can be combined together to perform same or substantially similar function in the MCPPT server (100).

Figure 3:
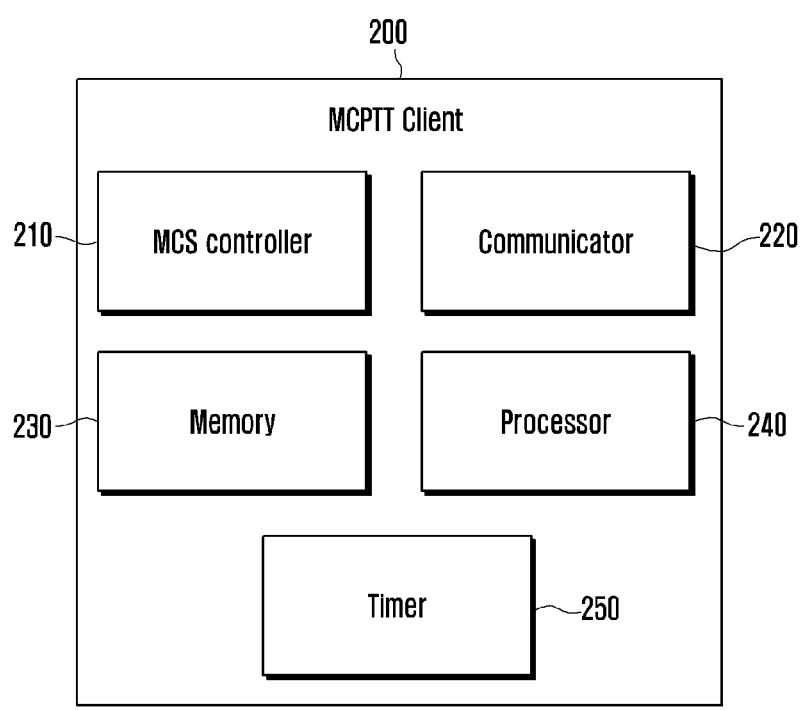
FIG. 3 illustrates various hardware components of a MCPPT client, according to embodiments as disclosed herein.

FIG. 3 shows various hardware components of the MCPPT client (200), according to embodiments as disclosed herein. In an embodiment, the MCPTT client (200) includes a MCS controller (210), a communicator (220), a memory (230), a processor (240), and a timer (250). The processor (240) is operated with the MCS controller (210), the communicator (220), the memory (230) and the timer (250).

The MCS controller (210) is configured to send the floor queued cancel request message to cancel the one or more queued floor request associated with the one or more MCPTT client (200b-200n) to the MCPTT server (100). In an embodiment, after sending the floor queued cancel request message, the MCS controller (210) is configured to start the timer (250) indicating the period for which the floor queued cancel request message may be cancelled. The MCS controller (210) is configured to determine that the one or more queued floor requests associated with the MCPTT client (200b-200n) is not cancelled upon expiry of the timer (250). Based on the determination, the MCS controller (210) is configured to resend the floor queued cancel request message to cancel the one or more queued floor request associated with the one or more MCPTT client (200b-200n) to the MCPTT server (100). Based on the floor queued cancel request message, the MCS controller (210) is configured to receive the response to the floor queued cancel request message from the MCPTT server (100).

Further, the MCS controller (210) is configured to notify the transition from the first state to the second state to the MCPTT server (100) based on the response. The MCS controller (210) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (240) is configured to execute instructions stored in the memory (230) and to perform various processes. The communicator (220) is configured for communicating internally between internal hardware components and with external devices via one or more networks. The memory (230) also stores instructions to be executed by the processor (240). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

At least one of the plurality of modules may be implemented through an Artificial intelligence (AI) model. A function associated with AI may be performed through the non-volatile memory, the volatile memory, and the processor (240). The processor (240) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 3 shows various hardware components of the MCPPT client (200) but it is to be understood that other embodiments are not limited thereon. In other embodiments, the MCPPT client (200) may include less or a greater number of components. Further, the labels or names of the components are used only for illustrative purpose and does not limit the scope of the present disclosure. One or more components can be combined together to perform same or substantially similar function in the MCPPT client (200).

Figure 4:
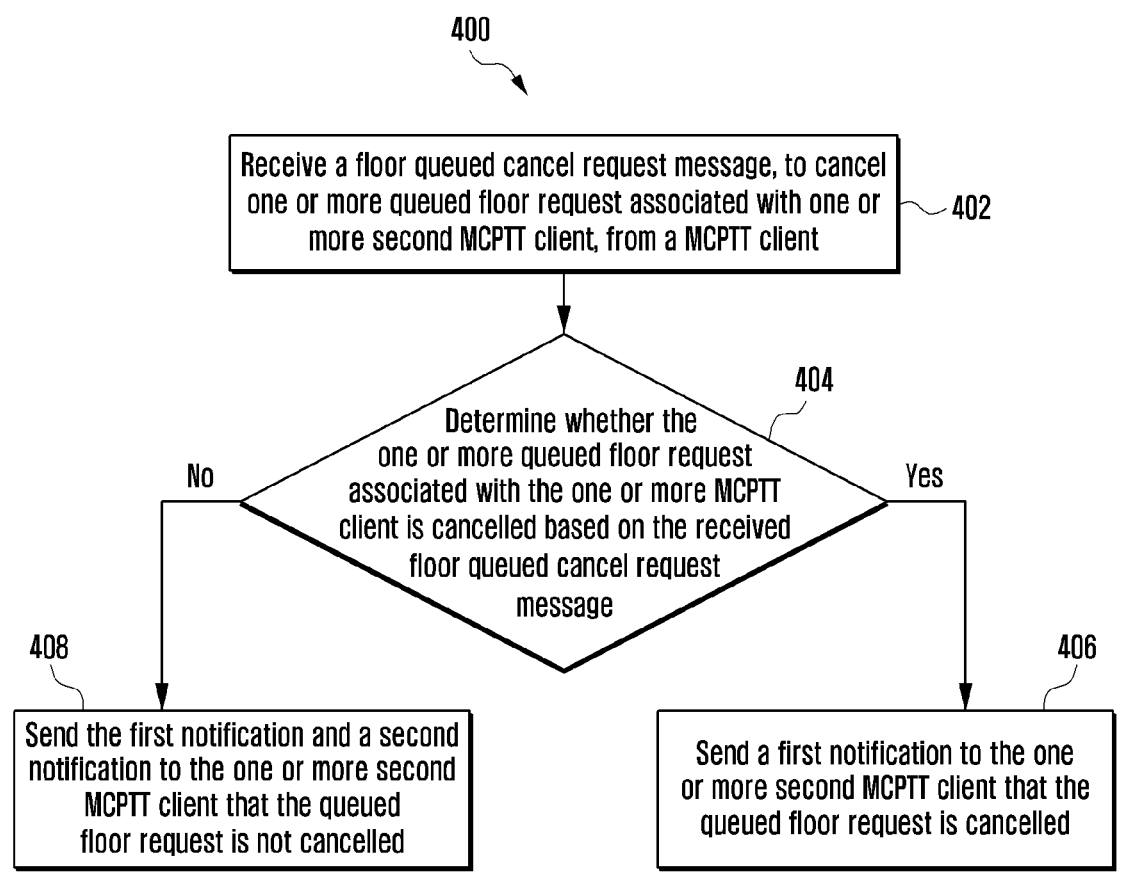
FIG. 4 is a flow chart illustrating a method, implemented by the MCPTT server, for handling the MCS in the wireless communication network, according to embodiments as disclosed herein.

FIG. 4 is a flow chart (400) illustrating a method, implemented by the MCPTT server (100), for handling the MCS in the wireless communication network (300), according to embodiments as disclosed herein. The operations (402-408) are performed by the MCS controller (110).

At 402, the method includes receiving the floor queued cancel request message, to cancel the one or more queued floor request associated with the one or more MCPTT client (200b-200n), from the MCPTT client. At 404, the method includes determining whether the one or more queued floor request associated with the one or more MCPTT client (200b-200n) is cancelled based on the received floor queued cancel request message. At 406, the method includes sending the first notification to the one or more MCPTT client (200b-200n) that the one or more queued floor request is cancelled. At 408, the method includes sending the second notification to the one or more MCPTT client (200b-200n) that the one or more queued floor request is not cancelled.

Figure 5:
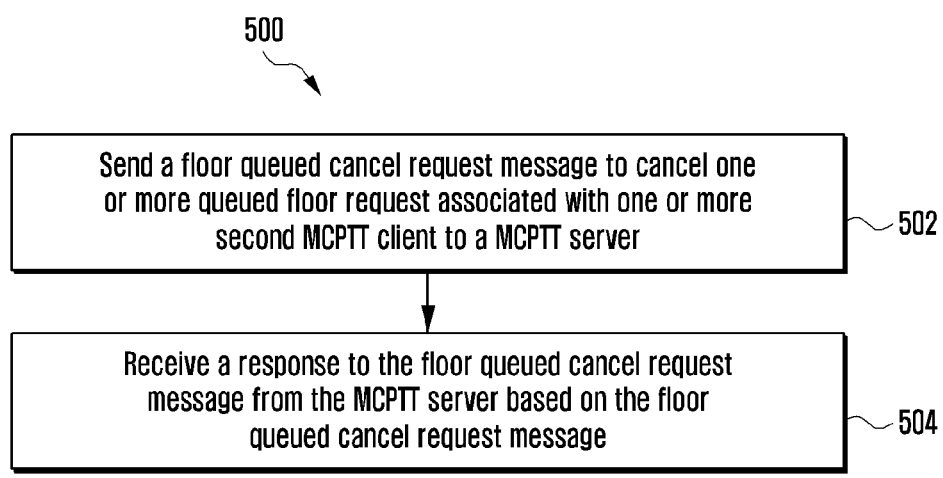
FIG. 5 is a flow chart illustrating a method, implemented by the MCPTT client, for handling the MCS in the wireless communication network, according to embodiments as disclosed herein.

FIG. 5 is a flow chart (500) illustrating a method, implemented by the MCPTT client (200a), for handling the MCS in the wireless communication network (300), according to embodiments as disclosed herein. The operations (502 and 504) are performed by the MCS controller (210).

At 502, the method includes sending the floor queued cancel request message to cancel the one or more queued floor request associated with the one or more MCPTT client (200b-200n) to the MCPTT server (100). At 504, the method includes receiving the response to the floor queued cancel request message from the MCPTT server (100) based on the floor queued cancel request message.

The various actions, acts, blocks, steps, or the like in the flow charts (400 and 500) may be performed in the order presented, in a different order or simultaneously. Further, in some embodiments, some of the actions, acts, blocks, steps, or the like may be omitted, added, modified, skipped, or the like without departing from the scope of the present disclosure.

Figure 6:
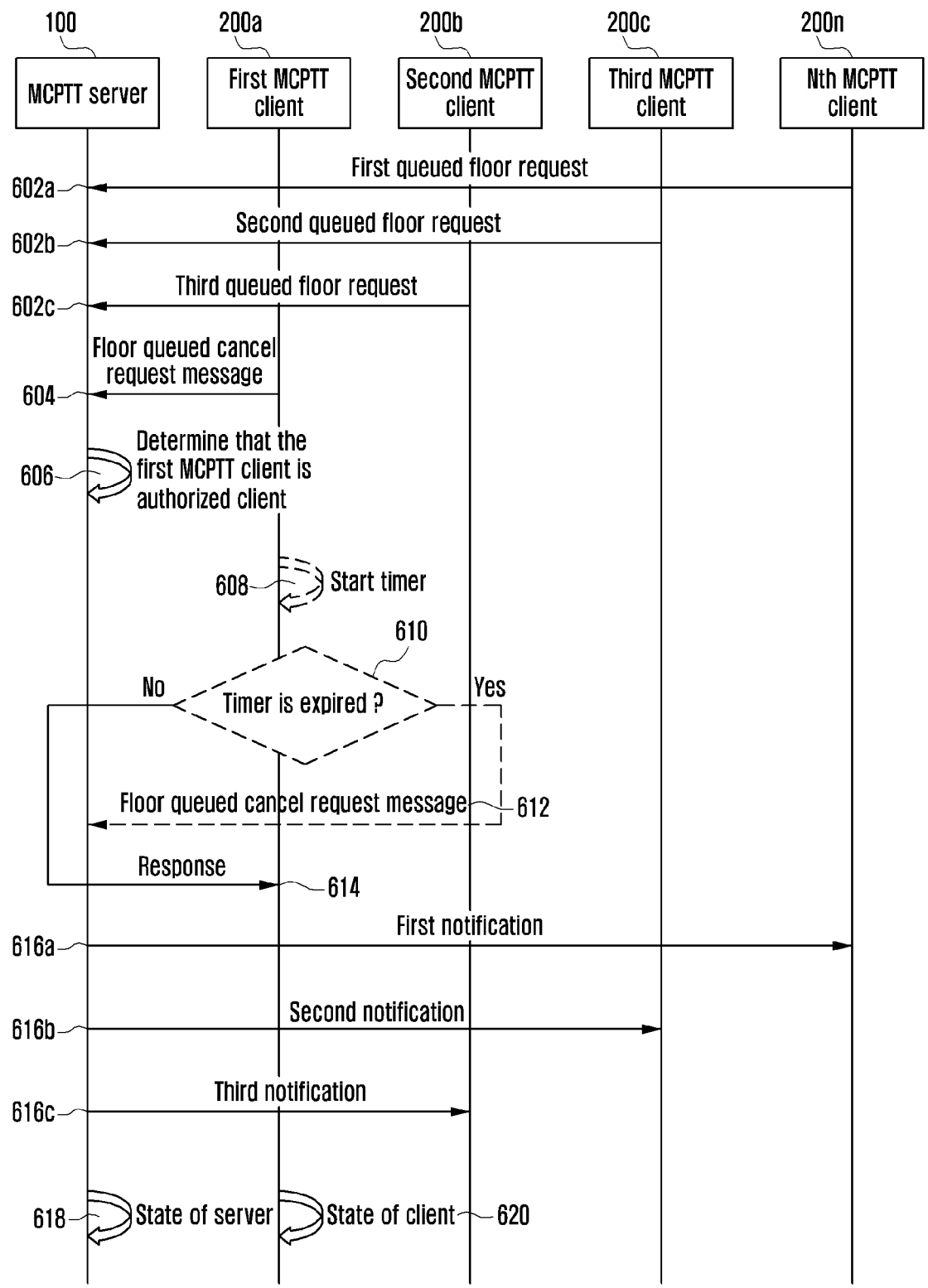
FIG. 6 is a sequence flow diagram illustrating step by step operations for handling the MCS in the wireless communication network, according to embodiments as disclosed herein.

FIG. 6 is an example sequence flow diagram illustrating step by step operations for handling the MCS in the wireless communication network (300), according to embodiments as disclosed herein. In general, once the call is established, multiple users associated with the one or more MCPTT client (200a-200n) can request for the floor. In an example, at 602a, the MCPTT client (200n) sends the first queued floor request to the MCPTT server (100). At 602b, the third MCPTT client (200c) sends the second queued floor request to the MCPTT server (100). At 602c, the second MCPTT client (200n) sends the third queued floor request to the MCPTT server (100). Now, the first queued floor request, the second queued floor request and the third queued floor request are in the floor queue. At 604, the MCPTT client (200a) sends the floor queued cancel request message to the MCPTT server (100).

At 606, the MCPTT server (100) determines that the first MCPTT client (200a) is the authorized client. At 608, the MCPTT client (200a) starts the timer (250) indicating the period for which the floor queued cancel request message may be cancelled. At 610, the MCPTT client (200a) determines whether the one or more queued floor request associated with the MCPTT client (200b-200c) is cancelled before expiry of the timer (250). If the one or more queued floor request associated with the MCPTT client (200b-200c) is not cancelled before expiry of the timer (250) then, at 612, the MCPTT client (200a) resends the floor queued cancel request message to cancel the one or more queued floor request associated with the one or more MCPTT client (200b-200c) to the MCPTT server (100).

If the one or more queued floor request associated with the MCPTT client (200b-200c) is cancelled before expiry of the timer (250) then, at 614, the MCPTT server (100) sends the response to the floor queued cancel request message from the MCPTT server (100).

At 616a, the MCPTT server (100) sends the first notification to the MCPTT client (200n). At 616b, the MCPTT server (100) sends the second notification to the MCPTT client (200c). At 616c, the MCPTT server (100) sends the third notification to the MCPTT client (200b). At 618, the MCPTT server (100) indicates the state of server (100). At 620, the MCPTT client (200a) indicates the state of client (200a).

The embodiments disclosed herein can be implemented through at least one software program running on at least one hardware device and performing network management functions to control the elements. The elements can be at least one of a hardware device or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a mission critical push to talk (MCPTT) server for handling a mission critical service (MCS) in a wireless communication network, the method comprising:
   receiving, from a first MCPTT client, a floor queued cancel request message to cancel at least one queued floor request, wherein the at least one queued floor request is associated with at least one second MCPTT client;
   identifying whether an active floor request queue is empty; and
   sending, to the first MCPTT client, a response corresponding to the floor queued cancel request message including a response state field indicating a result of a cancellation of the at least one queued floor request,
   wherein a value of the response state field is based on the identification of whether the active floor request queue is empty.

2. The method of claim 1, wherein:
   in case that the active floor request queue is empty, the value of the response state field indicates a failure of the cancellation of the at least one queued floor request due to the active floor request queue being empty, and
   in case that the active floor request queue is not empty, the value of the response state field indicates a success of the cancellation of the at least one queued floor.

3. The method of claim 1, further comprising receiving, from the first MCPTT client, a floor queued cancel request timeout message,
   wherein the floor queued cancel request timeout message is sent from the first MCPTT client in case that a timer associated with the floor queued cancel request message expires.

4. The method of claim 1, wherein, in case that a floor request associated with any of the at least one queued floor request included track information, the response to the floor queued cancel request message includes the track information.

5. The method of claim 1, wherein the floor queued cancel request message includes a list of user identifiers (IDs) of the at least one second MCPTT client.

6. The method of claim 5, further comprising, in case that the active floor request queue is not empty, removing a queued floor request of a user identified in the list of user IDs from the active floor request queue.

7. The method of claim 1, further comprising sending, to the at least one second MCPTT client, a floor queued cancel notification message to notify the at least one second MCPTT client of the at least one queued floor request being cancelled.

8. A method performed by a first mission critical push to talk (MCPTT) client for handling a mission critical service (MCS) in a wireless communication network, the method comprising:
   sending, to an MCPTT server, a floor queued cancel request message to cancel at least one queued floor request associated with at least one second MCPTT client; and
   receiving, from the MCPTT server, a response corresponding to the floor queued cancel request message including a response state field indicating a result of a cancellation of the at least one queued floor request,
   wherein a value of the response state field is identified based on whether an active floor request queue of the MCPTT server is empty.

9. The method of claim 8, wherein:
   in case that the active floor request queue is empty, the value of the response state field indicates a failure of the cancellation of the at least one queued floor request due to the active floor request queue being empty, and
   in case that the active floor request queue is not empty, the value of the response state field indicates a success of the cancellation of the at least one queued floor.

10. The method of claim 8, further comprising:
    starting a timer associated with the floor queued cancel request message; and
    in case that the timer expires, sending, to the MCPTT server, a floor queued cancel request timeout message.

11. A mission critical push to talk (MCPTT) server for handling a mission critical service (MCS) in a wireless communication network, the MCPTT server comprising:
    a transceiver; and
    a processor coupled with the transceiver and configured to:
      receive, from a first MCPTT client via the transceiver, a floor queued cancel request message to cancel at least one queued floor request, wherein the at least one queued floor request is associated with at least one second MCPTT client,
      identify whether an active floor request queue is empty, and
      send, to the first MCPTT client via the transceiver, a response corresponding to the floor queued cancel request message including a response state field indicating a result of a cancellation of the at least one queued floor request,
    wherein a value of the response state field is based on the identification of whether the active floor request queue is empty.

12. The MCPTT server of claim 11, wherein:
    in case that the active floor request queue is empty, the value of the response state field indicates a failure of the cancellation of the at least one queued floor request due to the active floor request queue being empty, and
    in case that the active floor request queue is not empty, the value of the response state field indicates a success of the cancellation of the at least one queued floor.

13. The MCPTT server of claim 11, wherein the processor is further configured to receive, from the first MCPTT client via the transceiver, a floor queued cancel request timeout message, and
    wherein the floor queued cancel request timeout message is sent from the first MCPTT client in case that a timer associated with the floor queued cancel request message expires.

14. The MCPTT server of claim 11, wherein, in case that a floor request associated with any of the at least one queued floor request included track information, the response to the floor queued cancel request message includes the track information.

15. The MCPTT server of claim 11, wherein the floor queued cancel request message includes a list of user identifiers (IDs) of the at least one second MCPTT client.

16. The MCPTT server of claim 15, wherein the processor is further configured to, in case that the active floor request queue is not empty, remove a queued floor request of a user identified in the list of user IDs from the active floor request queue.

17. The MCPTT server of claim 11, wherein the processor is further configured to send, to the at least one second MCPTT client via the transceiver, a floor queued cancel notification message to notify the at least one second MCPTT client of the at least one queued floor request being cancelled.

18. A first mission critical push to talk (MCPTT) client for handling a mission critical service (MCS) in a wireless communication network, the first MCPTT client comprising:
  a transceiver; and
  a processor coupled with the transceiver and configured to:
    send, to an MCPTT server via the transceiver, a floor queued cancel request message to cancel at least one queued floor request associated with at least one second MCPTT client, and
    receive, from the MCPTT server via the transceiver, a response corresponding to the floor queued cancel request message including a response state field indicating a result of a cancellation of the at least one queued floor request,
  wherein a value of the response state field is identified based on whether an active floor request queue of the MCPTT server is empty.

19. The first MCPTT client of claim 18, wherein:
  in case that the active floor request queue is empty, the value of the response state field indicates a failure of the cancellation of the at least one queued floor request due to the active floor request queue being empty, and
  in case that the active floor request queue is not empty, the value of the response state field indicates a success of the cancellation of the at least one queued floor.

20. The first MCPTT client of claim 18, wherein the processor is further configured to:
  start a timer associated with the floor queued cancel request message, and
  in case that the timer expires, send, to the MCPTT server via the transceiver, a floor queued cancel request timeout message.

* * * * *